Patented Jan. 20, 1942

2,270,354

UNITED STATES PATENT OFFICE 2,270,354

DYESTUFF INTERMEDIATE OF THE ANTHRAQUINONE BENZACRIDONE SERIES

Frederic B. Stilmar, Woodstown, N. J., assignor to E. I. du Pont de Nemours & Company, Wilmington, Del., a corporation of Delaware No Drawing. Application February 24, 1941, Serial No. 380,308

2 Claims. (Cl. 260—276)

This invention relates to the preparation of a dyestuff intermediate of the anthraquinone series and more particularly to the preparation of 1,9-pyrazolanthrone-5,6-benzacridone which may be employed in the preparation of vat dyestuffs.

Pyrazolanthrone and its simple monovalent substitution derivatives are known as valuable dye intermediates, so also is the anthraquinone-2,1(N)-benzacridone a well known molecule in the anthraquinone vat dye field. Both the pyrazole ring and the benzacridone grouping when attached to the anthraquinone nucleus impart certain characteristics to the molecule and give it a greater importance for the preparation of vat dyestuffs.

It is the object of the present invention to produce a dyestuff intermediate of the anthraquinone series which contains both the pyrazole and the benzacridone groups which may be further condensed with dyestuff intermediates to produce new and valuable dyes.

I have found that when 1-amino-5-phenylaminoanthraquinone-2'-carboxylic acid is diazotized, the resulting product, reduced to the hydrazine and then ring closed with acid ring closing agents, that 1,9-pyrazolanthrone-6,5(N)-benzacridone is obtained in good yields. Both the hydrazine and the phenylamino-ortho-carboxylic acid are ring closed simultaneously during the reaction.

The following examples are given to illustrate the invention:

Example 1

To 1000 grams 96% sulfuric acid, cooled below 10° C., there was added 100 grams 1-amino-5-anthraquinonyl anthranilic acid (obtained from 1-amino-5-chloro-anthraquinonyl anthranilic acid).

Then, over ¾ hour, there was added 20 grams sodium nitrite.

After stirring for two hours, the solution was poured into a mixture of 3000 grams ice and 1000 grams water.

After filtering off the insoluble violet precipitate, it was washed with 500 cc. cold water.

The cake was then added, at 10-15°, to a solution of 200 grams sodium carbonate and 250 grams sodium sulfite (100%) in 4 liters water.

After stirring for an hour, the solution was heated gradually to 90-95° C., and held there for an hour. Upon cooling to 20-25° C., the solution was filtered from a slight amount of sludge, and the residue washed with 350 cc. water. The filtrate was acidified at 65-70° with 1200 grams hydrochloric acid, the product coming out as hair-like crystals. After heating to 90-95° C., the product was filtered off, washed and dried.

It is represented by the formula:

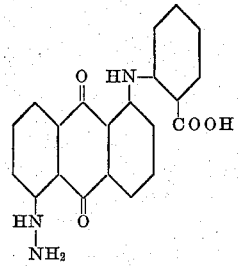

Example 2

Fifty grams 1-hydrazino-5-anthraquinonyl-anthranilic acid was added to 500 grams 96% sulfuric acid and the solution heated to 95-100° and held for two hours.

The solution was then diluted by slowly dropping in 373 cc. water.

The product was filtered off, washed with 55% sulfuric acid, and finally with water until free from acid.

It has the following formula:

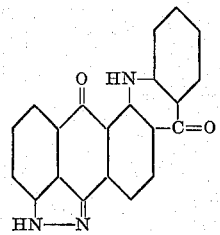

In effecting the ring closure, sulfuric acid, chloro-sulfonic acid or other similar reacting agent may be employed.

The 1,9-pyrazolanthrone-5,6-benzacridone gives valuable gray dyestuffs when condensed first with equal molecular proportions of 6-bz-1-dibromobenzanthrone and the resulting product condensed with 1-aminoanthraquinone and fused as more particularly described for the preparation of anthraquinonylaminobenzanthrone acridines. This new intermediate may also be reacted upon by the reagents normally employed in the preparation of dyestuffs from either the benzacridone or the pyrazolanthrone compounds.

I claim:

1. 1,9-pyrazolanthrone-6,5(N)-benzacridone.
2. The process for preparing 1,9-pyrazolanthrone-6,5-(N)-benzacridone which comprises diazotizing 1-amino-5-phenylaminoanthraquinone-2'-carboxylic acid, converting the resulting diazo compound to the 1-hydrazino-5-phenylaminoanthraquinone-2'-carboxylic acid and subjecting this product to a ring closure condensation with an acid condensing agent to effect ring closure of both the pyrazole and the benzacridone rings in the same reaction.

FREDERIC B. STILMAR.

CERTIFICATE OF CORRECTION.

Patent No. 2,270,354. January 20, 1942.

FREDERIC B. STILMAR.

It is hereby certified that error appears in the printed specification of the above numbered patent requiring correction as follows: First column, line 39, for "anthraquinonyl" read --anthraquinone and--; and that the said Letters Patent should be read with this correction therein that the same may conform to the record of the case in the Patent Office.

Signed and sealed this 7th day of April, A. D. 1942.

(Seal)

Henry Van Arsdale,
Acting Commissioner of Patents.